April 21, 1925.  
T. F. GRAY  
1,534,701  
VALVE  
Filed April 10, 1924
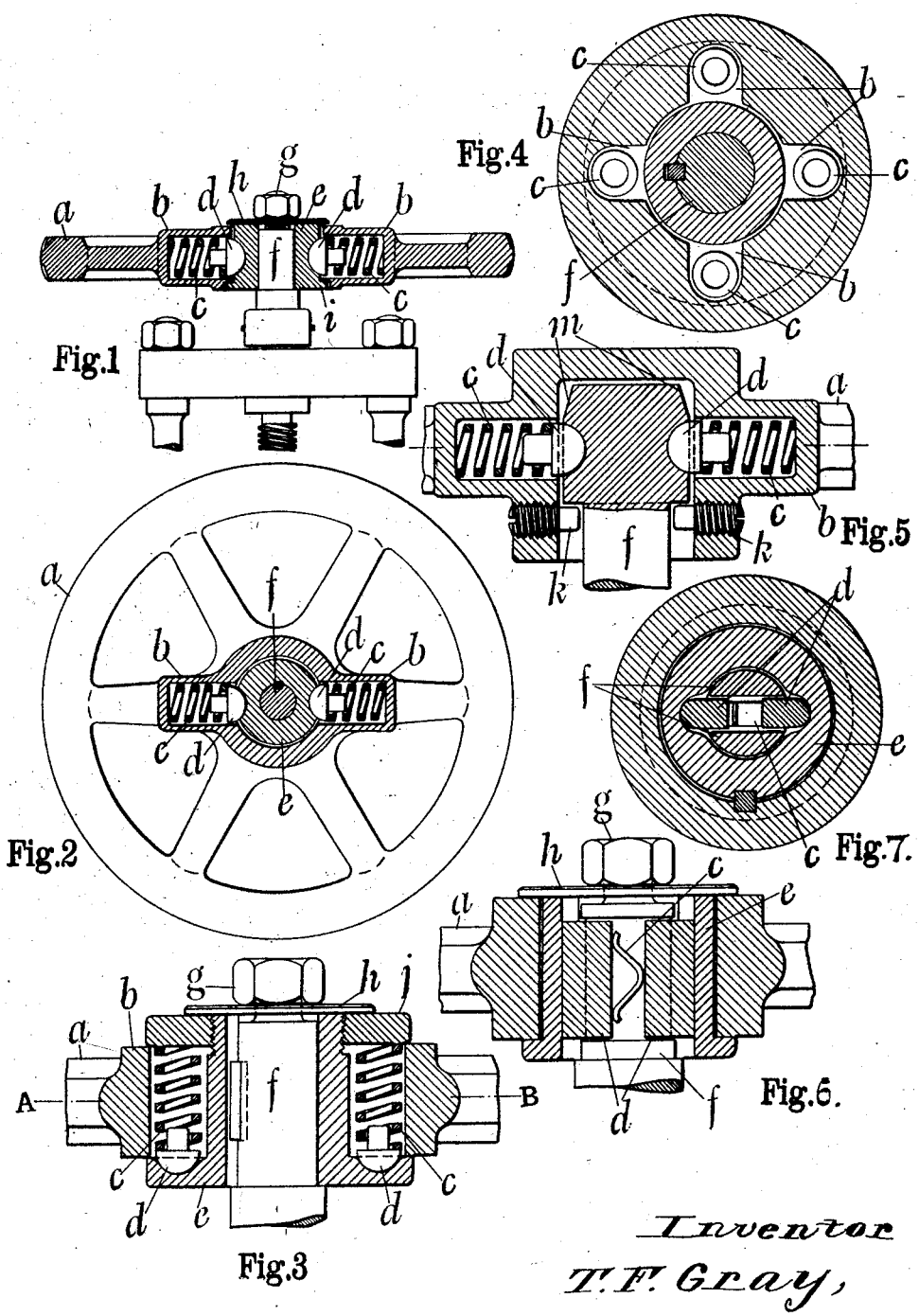
Inventor  
T. F. Gray,  
By Marks & Clerk  
Attys Patented Apr. 21, 1925.

1,534,701

UNITED STATES PATENT OFFICE.

TOM FREDERICK GRAY, OF MANCHESTER, ENGLAND.

VALVE.

Application filed April 10, 1924. Serial No. 705,623.

*To all whom it may concern:*

Be it known that I, TOM FREDERICK GRAY, a subject of the King of Great Britain and Ireland, and resident of 4 Clarence Street, Manchester, England, have invented certain new and useful Improvements Relating to Valves, of which the following is a specification.

This invention relates to valves and has for its object to provide simple and efficient means for preventing the setting up of destructive stresses within the valve, damage to the valve seating surfaces, or fracture of the valve spindle or of the valve seat by the application of excessive pressure to the valve hand wheel or its equivalent due to the use of levers or the like for forcing the valve on to its seat.

My invention comprises the provision within the hand wheel of a clutch device which gives an operative connection between the said wheel and the valve spindle until the pressure applied to the spindle exceeds the resistance of the valve by a predetermined amount when the hand wheel and spindle can have relative rotary movements.

Referring to the accompanying sheets of explanatory drawings:—

Figure 1 is a sectional elevation of a valve hand wheel upon a valve spindle, constructed and arranged in one convenient form in accordance with my invention.

Figure 2 is a plan view of the hand wheel shown in Figure 1, certain of the parts being shown in section.

Figure 3 is a sectional elevation of a modified arrangement of hand wheel on a valve spindle and Figure 4 a sectional plan view on the line A B of Figure 3, the spokes and rim of the hand wheel being omitted.

Figure 5 is a sectional elevation showing a futher modified arrangement of hand wheel.

Figure 6 is a sectional elevation and Figure 7 a sectional plan view of the hub portion of a hand wheel and the end of a valve spindle showing another modified construction.

The same reference letters in the different views indicate the same or similar parts.

In the arrangement illustrated in Figures 1 and 2, the hand wheel $a$ has two spring containing pockets $b$ therein on its inner side. Each spring $c$ in the said pockets bears on a plunger-like element $d$ having a rounded or hemispherical acting face adapted to enter a corresponding recess either in the valve spindle itself as in Fig. 5 or in a bush $e$ fitted upon the said spindle $f$ as in Figures 1 and 2. There may be more than two such recesses in the spindle or in the bush. The recess and the active face of each plunger are so shaped that when the hand wheel $a$ is rotated in a direction to close the valve, the plunger end remains in the recess under the pressure of its spring until a predetermined stress is exerted by the wheel upon the spindle $f$ when the wall of the recess forces the plunger into its pocket against the pressure of its spring and the driving connection between the wheel and spindle is thus released. Further rotation of the hand wheel does not therefore increase the pressure applied to the valve seating surfaces. The number of spring containing pockets, plungers and recesses is arranged to suit the size of valve and the allowable amount of pressure upon the valve faces.

The nut $g$ and plate $h$ retain the bush $e$ against the shoulder on the valve spindle, and also the hand wheel upon the bush, the latter having a shoulder or flange $i$ at its lower end.

The arrangement above described can be applied to existing valve spindles, the intermediate bush $e$ with the clutch recesses in its periphery fitting the spindle end as shown.

In the construction shown in Figures 3 and 4, the spring containing pockets $b$ are disposed parallel with the axis of the hand wheel instead of radially thereto as in the Figures 1 and 2 arrangement. Four pockets $b$ are shown. A disc $j$ which screws upon the bush $e$ keeps the hand wheel in position. The nut $g$ and washer $h$ hold the bush in position and prevent removal of the disc $j$.

In Figures 3 and 4, the springs $c$ are contained in pockets $b$ in the hand wheel, and the plungers $d$ are loaded by the springs, the plungers seating in recesses in the valve spindle or a part attached thereto.

As illustrated in Figure 5, the end of the valve spindle $f$ is enlarged and the recesses for the parts $d$ are formed in such enlarged end. Screwed studs $k$ prevent accidental withdrawal of the hand wheel. The end of the enlarged part of the spindle is tapered as shown at $m$ to facilitate the placing of the hand wheel thereon and the compression of the springs c. The hand wheel preferably forms a closed cover for the spindle end.

Instead of forming the recesses in the valve spindle and providing the spring pressed plunger like elements in the hand wheel or in a bush keyed therein, I may as shown in Figures 6 and 7 provide the plungers in the spindle by forming a slot therein in which are two plunger elements d with a spring c between them. The said plungers are adapted to enter rounded or hemi-spherical recesses in a bush e keyed within the hand wheel a. The hand wheel a and bush e may be formed in one piece if desired.

I claim:—

1. In valves, the provision within the hand wheel for operating the valve spindle, of a clutch device which gives an operative connection between the said wheel and spindle until the pressure applied to the spindle exceeds the resistance of the valve by a predetermined amount when the hand wheel and spindle can have relative rotary movements, as set forth.

2. In valves, the provision within the hand wheel of spring containing pockets, plunger like elements engaged by said springs, and recesses in the valve spindle into which said plungers project, as set forth.

3. In valves of the character described including a valve spindle member and a hand wheel member, the provision of spring pressed plungers within one of the members and recesses in the other of said members into which said plungers project.

In testimony whereof I have signed my name to this specification.

TOM FREDERICK GRAY.